United States Patent [19]
Hübscher et al.

[11] Patent Number: 5,896,238
[45] Date of Patent: Apr. 20, 1999

[54] EXTERIOR REARVIEW MIRROR FOR MOTOR VEHICLES

[75] Inventors: Winfried Hübscher, Jena; Rolf Alfred Engelmann, Weltwitz, both of Germany

[73] Assignee: EM Kunststofftechnik GmbH, Neustadt an der Orla, Germany

[21] Appl. No.: 08/962,413

[22] Filed: Oct. 31, 1997

[30] Foreign Application Priority Data

Oct. 31, 1996 [DE] Germany ............... 296 18 937

[51] Int. Cl.$^6$ .................. G02B 7/182; B60R 1/06
[52] U.S. Cl. ............ 359/877; 359/872; 439/49; 439/119; 439/283; 310/42; 310/71; 310/89; 310/DIG. 6
[58] Field of Search ............. 359/872, 873, 359/874, 876, 877; 439/49, 119, 283; 310/42, 71, 89, DIG. 6

[56] References Cited

U.S. PATENT DOCUMENTS

| | | | |
|---|---|---|---|
| 4,693,571 | 9/1987 | Kimura et al. | 359/877 |
| 4,701,037 | 10/1987 | Bramer . | |
| 4,815,837 | 3/1989 | Kikuchi et al. | 359/877 |
| 4,877,319 | 10/1989 | Mittelhauser | 359/841 |
| 4,915,493 | 4/1990 | Fisher et al. | 359/877 |
| 4,930,370 | 6/1990 | Yoshida | 359/877 |
| 4,991,950 | 2/1991 | Lang et al. | 359/877 |
| 5,294,084 | 3/1994 | Syamoto et al. | 359/877 |
| 5,311,368 | 5/1994 | Tsuyama | 359/877 |
| 5,313,336 | 5/1994 | Sakao et al. | 359/877 |
| 5,579,178 | 11/1996 | Mochizuki | 359/877 |
| 5,724,200 | 3/1998 | Mochizuki | 359/877 |

FOREIGN PATENT DOCUMENTS

| | | |
|---|---|---|
| 0331744 | 9/1989 | European Pat. Off. . |
| 4022019 | 1/1991 | Germany . |
| 4312847 | 10/1994 | Germany . |
| 06033 | 2/1997 | Japan . |
| 2297072 | 7/1996 | United Kingdom . |

*Primary Examiner*—Ricky D. Shafer
*Attorney, Agent, or Firm*—Robert W. Becker & Associates

[57] ABSTRACT

An exterior rearview mirror for a vehicle has a base and a mirror housing connected to the base. A mirror pane is movably connected in the mirror housing. An electrically operated drive unit for moving the mirror pane is provided. The drive unit includes electric motors encapsulated by a drive unit housing. Electric lines for supplying the drive unit with electrical power are provided. A plug connector is positioned in the drive unit housing. The electric lines have a plug for insertion into the plug connector. The plug connector has electric connectors for connecting the motors to the plug connectors. The motors are connected to the electric connectors by a plug connection.

5 Claims, 1 Drawing Sheet

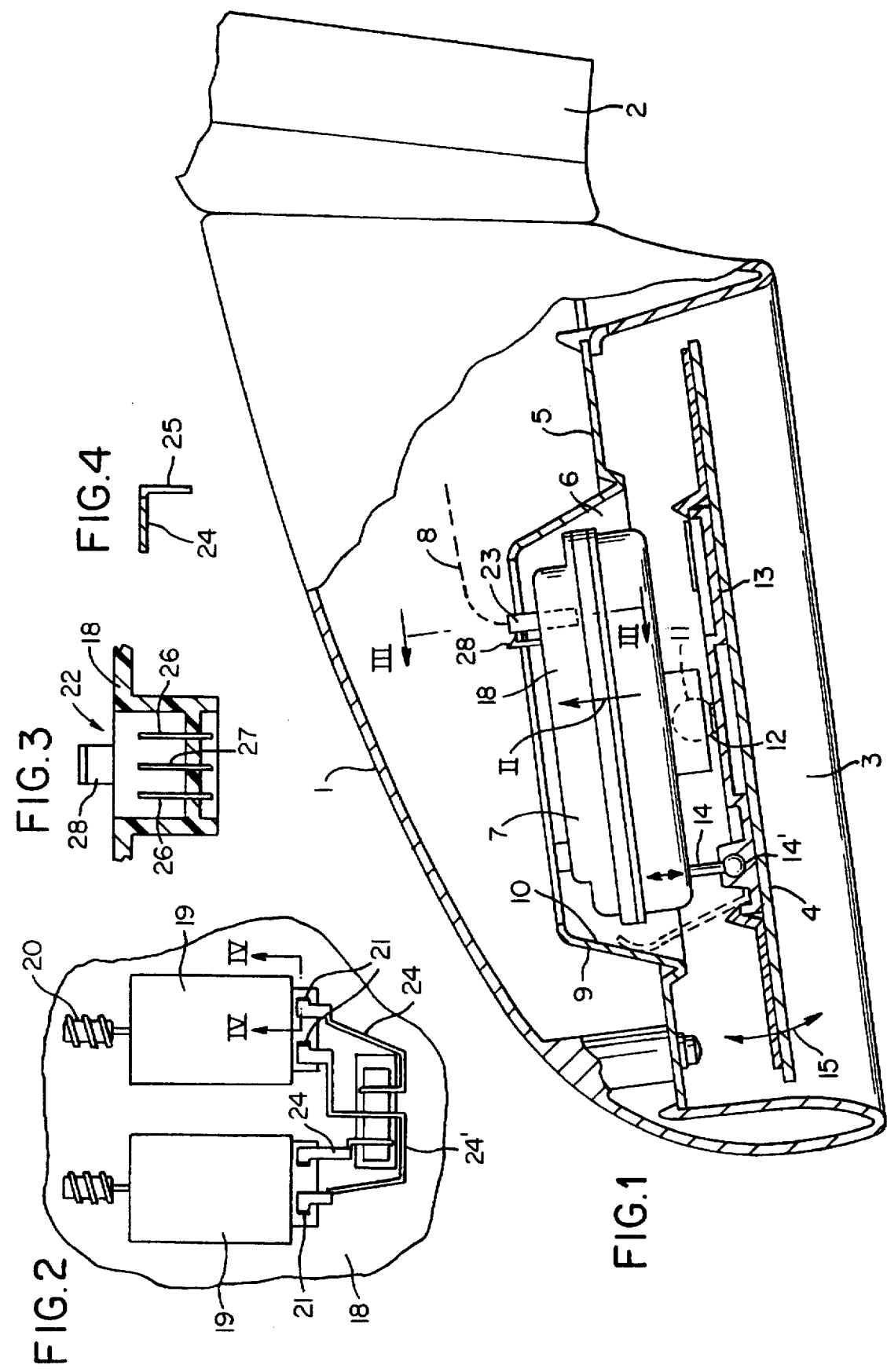

EXTERIOR REARVIEW MIRROR FOR MOTOR VEHICLES

BACKGROUND OF THE INVENTION

The present invention relates to an exterior rearview mirror for motor vehicles, comprising an electrically driven drive unit, encapsulated within a housing, for moving the mirror pane and including also electrical lines for supplying the drive unit with electric power.

Plug connections for electrically connecting the drive unit to a power supply are known for such mirrors. The corresponding plugs have, however, such great size that, for mounting and demounting of the mirror, they cannot be easily introduced or removed through respective wall openings in order to facilitate mounting. The electrical connections within the housing of the drive unit are therefore often realized by soldering, respectively, by crimping, which requires special working steps.

It is therefore an object of the present invention to improve a mirror of the aforementioned kind such that an especially simple mounting and assembly of the exterior rearview mirror is possible.

SUMMARY OF THE INVENTION

A rearview mirror for a vehicle according to the present invention is primarily characterized by:

A base and a mirror housing connected to the base;

A mirror pane movably connected in the mirror housing;

An electrically operated drive unit for moving the mirror pane;

A drive unit housing encapsulating the drive unit;

The drive unit comprising electric motors;

Electric lines for supplying the drive unit with electrical power;

A plug connector positioned in the drive unit housing;

The electric lines having a plug for insertion into the plug connector;

The plug connector comprising electric connectors for connecting the motors to the plug connector;

The motors connected to the electric connectors by a plug connection.

Advantageously, the electric connectors are strip leads.

These strip leads preferably comprises first ends forming a part of the plug connector.

These strip leads comprise projecting tongues forming a part of the plug connector.

The strip leads comprise first ends and projecting tongues forming a part of the plug connector.

Advantageously, the strip leads comprise second ends and the motors have poles. The second ends are plugged into the poles to form the plug connection.

The plug connector comprises a pole formed by a projecting tongue of the strip lead. The strip lead has a first and a second end connected to poles of the motors.

The plug connector has poles formed by ends of the strip leads, wherein the ends have wide and narrow sides and wherein the ends are arranged parallel to one another such that the wide sides of the ends face one another.

The strip leads have a width of 2 to 3 mm, and a thickness of a main body of the strip lead is 0.3 to 0.5 mm, wherein ends of the strip leads have a greater thickness than the main body.

The thickness of the ends is preferably 0.8 mm.

Advantageously, the thickness of the main body is 0.4 mm.

The present invention also relates to a drive unit for moving a mirror pane of a rearview mirror. The drive unit according to the present invention is primarily characterized by:

A drive unit housing;

Electric motors encapsulated in the drive unit housing;

Electric lines for supplying the motors with electric power;

A plug connector positioned in the drive unit housing;

The electric lines having a plug for insertion into the plug connector;

The plug connector comprising electric connectors for connecting the motors to the plug connector;

The motor connected to the electric connectors by a plug connection.

According to the present invention, the electrical lines of the drive unit as well as the electric connectors within the drive unit housing connected to the electric motors are in the form of plug connections.

It is especially advantageous in this context that the aforementioned electric connectors within the drive unit housing of the drive unit are in the form of metal strips, i.e., small metal bands of a flat rectangular cross-section. Their ends can be made into contacts by doubling the material and/or projecting tongues may be provided as contacts. It is thus possible to introduce the ends of the strip leads directly into respective recesses of the electric motors in order to provide electrical connection. At the same time, the strip lead ends, respectively, the projecting tongues can be positioned parallel to one another with the wider side of the ends and/or the tongues facing one another and mounted such that a plug can be placed from the exterior onto them in order to supply electric power to the drive unit. The tongues or ends, because of their parallel arrangement, allow such small dimensions for the plug connector that plugs to be connected thereto from the exterior can be of a small size. When mounting such plugs and electric lines, they can be easily introduced through respective cutouts in the wall portion to which the exterior rearview mirror is to be mounted.

BRIEF DESCRIPTION OF THE DRAWINGS

The object and advantages of the present invention will appear more clearly from the following specification in conjunction with the accompanying drawings, in which:

FIG. 1 shows a horizontal cross-sectional view of an exterior rearview mirror of a motorized vehicle;

FIG. 2 shows the interior of the drive unit for moving the mirror pane viewed in a direction of arrow II;

FIG. 3 is a part-sectional view according to line III—III of FIG. 1 without the plug for supplying electric power to the drive unit; and FIG. 4 is a section of a strip lead contact along the line IV—IV of FIG. 2.

DESCRIPTION OF PREFERRED EMBODIMENTS

The present invention will now be described in detail with the aid of several specific embodiments utilizing FIGS. 1 through 4.

The curved housing 1 of the mirror is supported on a base 2 at the vehicle. The opening 3 of the housing 1 faces, as is conventional, counter to the travel direction of the vehicle and receives the mirror pane 4. Within the housing 1 a mounting plate 5 with opening 6 is provided in which the electrical drive unit 7 with electric lines (connecting cables) 8 is provided. The opening 6 is delimited by a collar 9 having a conical inner surface 10.

The side of the drive unit 7 facing the opening 3 has a socket 11 for receiving a ball 12 which is fixedly connected to the plate-shaped holder 13. In the edge area of the holder 13 two sockets 14' are provided that are staggered by 90° relative to one another and which receive pushrods 14 that are longitudinally movable by the drive unit 7 in order to pivot or move the holder 13, respectively, to achieve a mirror adjustment in the direction of double arrow 15.

The drive unit 7 with encapsulating drive unit housing 18 has electric motors 19 in its interior for moving the pushrods which are moved by worm gears 20. The electric power supply for each motor 19 is realized via poles 21 which are connected to a three-pole plug connector 22. The plug connector 22 together with a plug 23 provides a connection to the electric lines (cables) 8.

The connection of the plug connector 22 to the poles 21 is realized with strip leads 24 comprised of a conducting metal having a flat rectangular cross-section of a width of approximately 2 to 3 mm and a wall thickness of approximately 0.3 to 0.5 mm. Preferably, the wall thickness is 0.4 mm.

In order to contact the poles 21 and the strip leads 24, the ends of the strip leads, as shown in FIG. 4, are angled in the manner of a tab 25 in a downward direction so that they can be easily inserted for contacting into the contact side of the motors 19. The other ends of the strip leads 24 are introduced laterally into the housing of the plug connector 22 and form either with their ends 26 or their laterally projecting tongues 27 (preferably in the case of the centrally arranged contact strip lead 24' connected with its connecting ends respectively to one pole 21 of each motor 19) the contacts of the plug connector 22 onto which the plug 23 is slipped.

It is important in this context that within the plug connector 22 the wider sides of the strip leads 24, i.e., its ends 26 or tongues 27, face one another and are not positioned such that the wider sides are in a common plane. This results in a very compact design of the plug connector 22 and of the plug 23 so that the ends of the electric lines 8, respectively, the plug 23 connected thereto, are not unnecessarily enlarged.

As can be seen in the drawings, the strip leads 24 are connected in a simple manner, i.e., by a plug connection, to the poles 21 and to the plug connector 22 which, in turn, is connected by plug 23 to the electric lines 8 in a contacting but detachable manner. Thus no crimping or soldering connections within the housing of the drive unit 7 are necessary because mounting is achieved in a simple manner by insertion of the strip leads 24.

It should be noted that optionally the strip ends 25, 26 and the tongue or tongues 27 can be formed by folding etc. in order to provide a thicker contact area. Preferably, a thickness of approximately 0.8 mm is selected in order to comply with electric standards.

As can be seen in FIG. 1, the plug 23 is secured by a hook 28 against accidental displacement.

The present invention is, of course, in no way restricted to the specific disclosure of the specification and drawings, but also encompasses any modifications within the scope of the appended claims.

What is claimed is:

1. A rear view mirror for a vehicle, said rear view mirror comprising:

a base and a mirror housing connected to said base;

a mirror pane moveably connected in said mirror housing;

an electrically operated drive unit for moving said mirror pane;

a drive unit housing encapsulating said drive unit;

said drive unit comprising electric motors having poles formed as recesses;

electric lines for supplying said drive unit with electrical power;

a plug connector positioned in said drive unit housing;

said electric lines having a plug for insertion into said plug connector;

said plug connector comprising electric connectors for connecting said motors to said plug connector;

said motors connected to said electric connectors by a plug connection, wherein said recesses are part of said plug connection;

wherein said electric connectors are strip leads;

wherein a first one of said strip leads has a projecting tongue forming a pole of said plug connector;

wherein said first strip lead has connecting ends as part of said plug connection and wherein said connecting ends are plugged into said recesses of said motors to form said plug connection;

wherein second ones of said strip leads comprise first ends forming poles of said plug connector;

wherein said second strip leads comprise second ends forming part of said plug connection and plugged into said recesses of said motors to form said plug connection;

wherein said poles of said plug connector have wide and narrow sides and are arranged parallel to one another such that said wide sides face one another.

2. A rear view mirror according to claim 1, wherein said strip leads have a width of 2–3 mm and wherein a thickness of a main body of said strip leads is 0.3–0.5 mm, wherein ends of said strip leads have a greater thickness than said main body.

3. A rear view mirror according to claim 2, wherein said thickness of said ends is 0.8 mm.

4. A rear view mirror according to claim 2, wherein said thickness of said main body is 0.4 mm.

5. A drive unit for moving a mirror pane of a rear view mirror, said drive unit comprising:

a drive unit housing;

electric motors encapsulated in said drive unit housing and having poles, formed as recesses;

electric lines for supplying said motors with electric power;

a plug connector positioned in said drive unit housing;

said electric lines having a plug for insertion into said plug connector;

said plug connector comprising electric connectors for connecting said motors to said plug connector;

said motors connected to said electric connectors by a plug connection, wherein said recesses are part of said plug connection;

wherein said electric connectors are strip leads;

wherein a first one of said strip leads has a projecting tongue forming a pole of said plug connector;

wherein said first strip lead has connecting ends as part of said plug connection and wherein said connecting ends are plugged into said recesses of said motors to form said plug connection;

wherein second ones of said strip leads comprise first ends forming poles of said plug connector;

wherein said second strip leads comprise second ends forming part of said plug connection and plugged into said recesses of said motors to form said plug connection;

wherein said poles of said plug connector have wide and narrow sides and are arranged parallel to one another such that said wide sides face one another.

* * * * *